APPARATUS FOR DETERMINING THE FORCE OF GRAVITY AT SEA
Filed Aug. 16, 1927
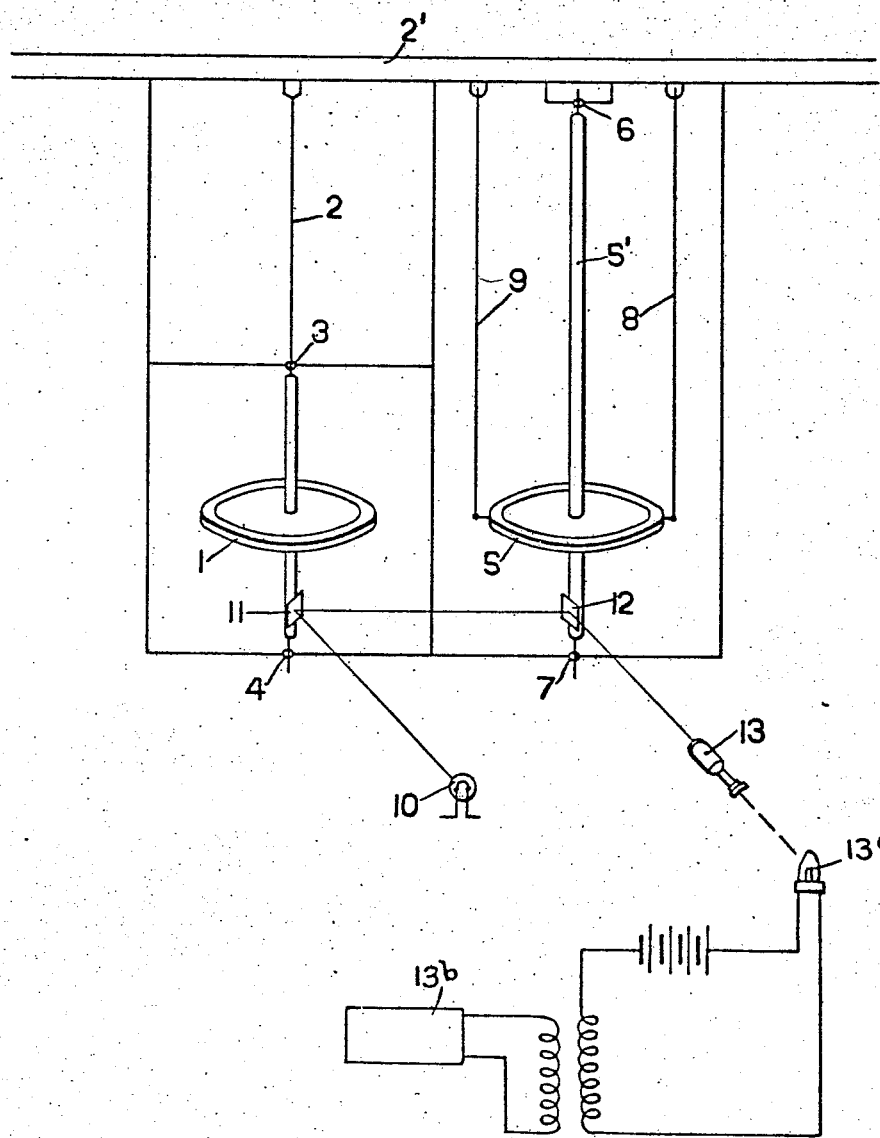
Inventor
HARVEY C. HAYES Patented Feb. 10, 1931

1,792,013

UNITED STATES PATENT OFFICE

HARVEY C. HAYES, OF WASHINGTON, DISTRICT OF COLUMBIA

APPARATUS FOR DETERMINING THE FORCE OF GRAVITY AT SEA

Application filed August 16, 1927. Serial No. 213,426.

(GRANTED UNDER THE ACT OF MARCH 3, 1883, AS AMENDED APRIL 30, 1928; 370 O. G. 757)

The invention herein described may be manufactured and used by or for the Government of the United States for governmental purposes without the payment to me of any royalty thereon or therefor.

A primary object of the present invention is to improve and simplify the methods now commonly employed for the determination of what is herein termed the "gravitational constant", commonly designated by the character $(g)$, and more specifically to provide a suitable apparatus for carrying out the novel method at sea. To this end, an incidental object of the invention has been to devise a suitable gravity pendulum which will not be affected by the rolling and pitching movements of a vessel at sea but whose period of oscillation will be affected by the value of the gravitational constant, i. e., the force of gravity upon a unit mass at the particular point where the pendulum is located.

It is well known that the variation in the force of gravity from place to place over the earth's surface is dependent to a large extent upon the nature of the earth's crust at the particular localities, and especially upon the nature of that portion of the crust which is near the surface. This fact has given rise to a desire to make extensive surveys of various portions of the earth's surface, including the bottoms of the oceans. For this purpose, use has been made of the well known formula $$\left(t^2 = \frac{K}{g}\right)$$

in which $(t)$ represents the period of oscillation of a gravity pendulum, $(K)$ is a constant which is wholly dependent upon the inherent characteristics of the pendulum and is invariable as the pendulum is moved from place to place; while $(g)$ is the value of the gravitational constant. On the basis of this formula, it has been customary heretofore to determine the characteristics of a particular gravity pendulum by setting it up at a standard location and to then make accurate determinations of the period of oscillation of this pendulum as it is shifted from place to place over an area to be surveyed. In accordance with the methods commonly in use, this has necessitated the employment of a very accurate chronometer whose readings have had to be very accurately determined in conjunction with a certain number of oscillations of the pendulum. Any inaccuracies in the chronometer will, in accordance with the formula, be doubled in the determination of the value of $(g)$ and it will be apparent that by this method it is impossible to distinguish very slight variations or discontinuities in the earth's crust due to difficulty in obtaining accurate fractional time readings.

By the present invention, it is proposed to eliminate the necessity for an accurate chronometer by the employment of two pendulums in proximity to each other, the one pendulum being of a type which may be termed "standard" and which is unaffected by the variations in the force of gravity, while the second pendulum is of a type distinctly affected by such variations in the force of gravity.

In connection with the use of a gravity survey as an aid to the determination of the nature of the earth's crust, it is to be noted that the important factor is not the actual value of $(g)$ at the various points of the earth's surface but merely its variation from place to place over this surface. The present method is, therefore, particularly concerned with the determination of the difference in the value of the gravitational constant as indicated by the difference in the period of oscillation of the gravity-affected pendulum as it is moved from place to place. Of course whenever it is desired to determine the actual value of $(g)$ at any point, it may readily be done by first establishing the pendulum at a standard location where the value of $(g)$ is known, and thus determining the inherent characteristics of the particular pendulum.

It has been extremely difficult in the past to obtain any accurate determinations of the value of gravity in connection with points at sea due to the fact that there have been no suitable pendulums available which will be sensitive to the variations in gravity but which will not be materially affected by the movements of a vessel at sea. The provision of a suitable pendulum for this purpose is therefore a very important feature of the present invention.

Before passing to the description of one suitable form of apparatus which may be employed in the conduct of the present method, as illustrated in the accompanying drawing, it may be well to outline briefly the equational relations by means of which the variations in the gravitational constant may be readily determined.

In the conduct of the present method, it is proposed to set into oscillation two pendulums which have been hereinbefore mentioned, the one of which is affected by the force of gravity and the other not. The number of oscillations of these pendulums may be determined over a given period by permitting a definite number of oscillations of the standard pendulum, such as ($N_T$), and by determining the number of coincidences in the swings of the two pendulums during this period in any suitable way as by the method of eclipses. If ($N_g$) represents the total number of oscillations of the gravity pendulum during the same period (T) and ($n$) represents the number of coincidences or eclipses, then ($N_g = N_T \pm n$). If ($t_g$) represents the period of oscillation of the gravity pendulum, and ($t_T$) represents the period of oscillation of the standard pendulum, then ($T = N_g \times t_g = N_T \times t_T$). Substituting the previously given value of ($N_g$) and dividing through by this quantity, we have the relation $$\left(t_g = \frac{N_T}{N_T \pm n} \times t_T\right).$$

Since the value of ($t_T$) remains constant regardless of the location of the instruments, it may be definitely determined once and for all by counting the number of oscillations over a period of time of considerable duration. By then adopting a standard number of oscillations for the value of ($N_T$) which may be gauged by a definite time interval through the use of an ordinary watch, all that remains for observation is the value of ($n$) or the number of eclipses.

Having determined the value of ($t_g$) from the data thus obtained, the value of ($g$) may readily be determined from the formula first given, viz.

$$\left(t^2 = \frac{K}{g}\right) \text{ or } \left(g = \frac{K}{t_g^2}\right).$$

If it is not desired to determine the absolute values of ($g$) but merely the comparative values of the latter as existing over a definite area, it will not be necessary to accurately determine the value of ($t_T$) since this may be treated as a constant and the relative values of ($t_g$) and of ($g$) itself at various points may be determined just as readily by ignoring this period of the standard pendulum.

With this outline of the general nature of the novel method contemplated by the present invention, a more definite understanding may be had from a consideration of the single figure of the accompanying drawing which illustrates diagrammatically one suitable form of apparatus for carrying out the method.

In the drawing (1) designates the inertia member of a torsion balance which is suspended by means of a torsion filament (2) from a horizontal supporting member (2'). Suitable bearings are preferably provided at the points (3) and (4) for the purpose of keeping the pendulum in alinement when the support is rocked or in any way moved, as in the case of its installation in a vessel at sea. Adjacent this torsion pendulum is a second pendulum comprising an inertia member (5) which is mounted for oscillation in a horizontal plane by means of a vertical axis (5'), the latter being maintained in proper alinement by suitable bearings (6) and (7).

Two filaments (8) and (9) which are suspended from the horizontal support (2') are connected to the inertia member (5) at opposite ends of a diameter line of the latter. These filaments are preferably so dimensioned as to have a low co-efficient of torsion. When angularly displaced about the vertical axis, this pendulum executes rotational oscillations, the period of which is largely dependent upon the force of gravity. This is due to the fact, as will be apparent, that upon turning of the inertia member there will be a tendency of the filaments (8) and (9) to lift the member a slight extent against the force of gravity. A pendulum of this construction, while materially affected by the force of gravity, will not be detrimentally affected by rocking and rolling movements of the supporting structure, as by the movements of a ship at sea.

A suitable method of determining the co-incidences in the oscillations of the two inertia members (1) and (5) may consist in the provision of a mirror (11) on the pivotal axis of the torsion pendulum and a mirror (12) on the axis of the gravity pendulum. These mirrors may be so located that when the pendulums are at rest, a beam of light from a source (10) will be reflected by the mirror (11) to strike the mirror (12) from which it will be reflected to a point of observation as at (13). If desired, a light sensitive cell 13a may be placed at the point (13) to control suitable indicating or recording devices 13b. It will be understood that the mirrors (11) and (12) are quite small and that a beam of light can follow the course indicated from (10) to (13) only when the two mirrors pass through their points of rest at the same time.

While the foregoing serves to illustrate and explain one admirable form which the present invention may assume, it will be understood that modifications may be made in various features falling within the scope of the terms of the appended claims. Thus in place of the standard torsion pendulum suggested in the foregoing description there may be provided any oscillatory body whose frequency is entirely independent of the force of gravity and it is not necessary to cause any definite number of oscillations of the latter so long as the ratio of its period to that of the gravity affected pendulum is determined.

What I claim is:

1. A combined torsion and gravity pendulum comprising an inertia member adapted to oscillate in accordance with its own natural period, a vertical axis upon which said member is mounted and a pair of torsion filaments connected to said member at diametrically opposite points for suspending the latter.

2. In apparatus for determining the gravitational constant, a torsion pendulum, a combined torsion and gravity pendulum, and means for indicating the coincidences in the oscillations of said pendulums.

3. In apparatus for determining the gravitational constant at sea, a torsion pendulum including an inertia element, an axis for said element having fixed bearings, a combined torsion and gravity pendulum mounted adjacent said first mentioned pendulum on an axis having fixed bearings, and means for determining the relative periods of oscillation of said pendulums.

4. In apparatus for determining variations in the gravitational constant a support, a torsion pendulum suspended from said support, means for maintaining the same relation between said support and said pendulum during rocking of said support, a gravity pendulum comprising a rotary inertia member mounted in fixed relation with said support, and means for indicating the difference in the frequencies of said pendulums.

5. In apparatus for determining the gravitational constant, a torsion pendulum, a gravity pendulum having a rotary inertia member, a mirror carried by each of said pendulums, and means for directing a beam of light toward one of said mirrors, said beam being reflected to a point of observation by said mirrors jointly when both of said pendulums coincidentally pass definite points in their oscillations.

6. In apparatus for determining the gravitational constant, a torsion pendulum, a rotary gravity pendulum and means for indicating the relative periods of oscillation of said pendulums comprising means for directing and reflecting a beam of light toward said pendulums and thence toward a fixed point.

7. In apparatus for determining the gravitational constant, a torsion pendulum including an inertia element, an axis for said element having fixed bearings, a combined torsion and gravity pendulum mounted adjacent said firstmentioned pendulum, and means for determining the relative periods of oscillation of said pendulum.

8. In apparatus for determining the gravitational constant, a pendulum whose period is free from the influence of gravity, a gravity-affected pendulum, supporting means for said pendulums, means for preventing disturbance of said pendulums upon movements of said supporting means, and means for comparing the relative periods of oscillation of said pendulums.

9. A pendulum comprising an inertia disc adapted to oscillate in accordance with its own natural period in a substantially horizontal plane, a pivotal mounting for said disc, and a pair of torsion filaments connected to said disc at diametrically opposite peripheral points for suspending the latter.

HARVEY C. HAYES.